United States Patent
Ishikawa

(10) Patent No.: US 9,984,014 B2
(45) Date of Patent: May 29, 2018

(54) SEMICONDUCTOR DEVICE

(71) Applicant: Renesas Electronics Corporation, Tokyo (JP)

(72) Inventor: Naoshi Ishikawa, Tokyo (JP)

(73) Assignee: Renesas Electronics Corporation, Tokyo (JP)

( * ) Notice: Subject to any disclaimer, the term of this patent is extended or adjusted under 35 U.S.C. 154(b) by 202 days.

(21) Appl. No.: 14/967,010

(22) Filed: Dec. 11, 2015

(65) Prior Publication Data

US 2016/0275028 A1    Sep. 22, 2016

(30) Foreign Application Priority Data

Mar. 18, 2015 (JP) ................................. 2015-054518

(51) Int. Cl.
G06F 13/362 (2006.01)
G06F 13/40 (2006.01)

(52) U.S. Cl.
CPC ........ *G06F 13/362* (2013.01); *G06F 13/4068* (2013.01)

(58) Field of Classification Search
CPC .................................................... G06F 13/362
See application file for complete search history.

(56) References Cited

U.S. PATENT DOCUMENTS

| | | | |
|---|---|---|---|
| 8,190,801 B2 * | 5/2012 | Harris ................. | G06F 13/4027 710/113 |
| 2005/0132146 A1 * | 6/2005 | Kim ................... | G06F 13/1647 711/151 |

FOREIGN PATENT DOCUMENTS

JP    2006-331426 A    12/2006

* cited by examiner

*Primary Examiner* — Farley Abad
(74) *Attorney, Agent, or Firm* — McGinn IP Law Group, PLLC

(57) ABSTRACT

The present invention provides a technique for further improving the processing efficiency in a semiconductor device that arbitrates data transfer between a plurality of bus masters and a plurality of bus slaves.

A bus control circuit controls data transfer in an address bus and a data bus between a plurality of bus masters and a plurality of bus slaves. The bus control circuit obtains access information representing the bus slave that each of the bus masters accesses on the basis of address signals output from the bus masters. The bus control circuit obtains busy information representing whether or not each bus slave is in a busy state. In the case where the bus masters compete with each other when accessing a bus slave, the bus control circuit arbitrates access from each bus master to the bus slave that is not in a busy state in accordance with the priority set for each bus master on the basis of the access information and the busy information.

2 Claims, 5 Drawing Sheets

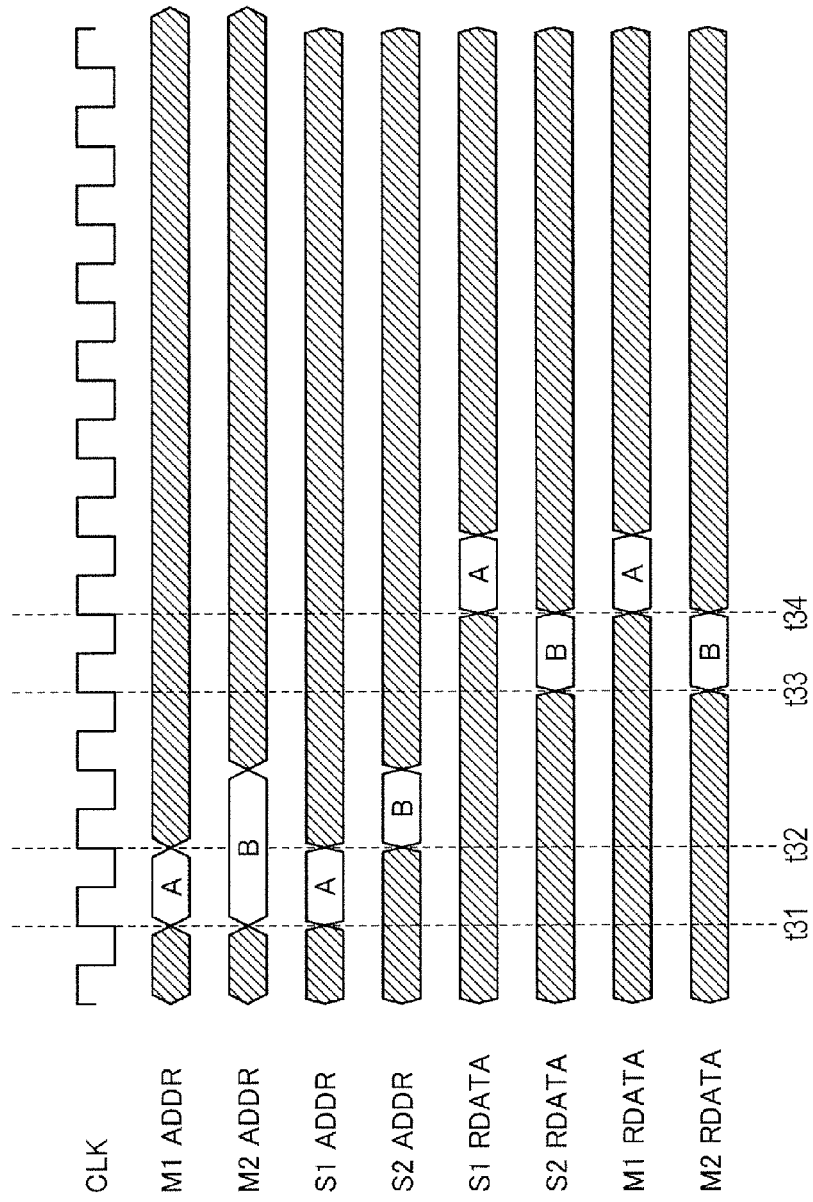

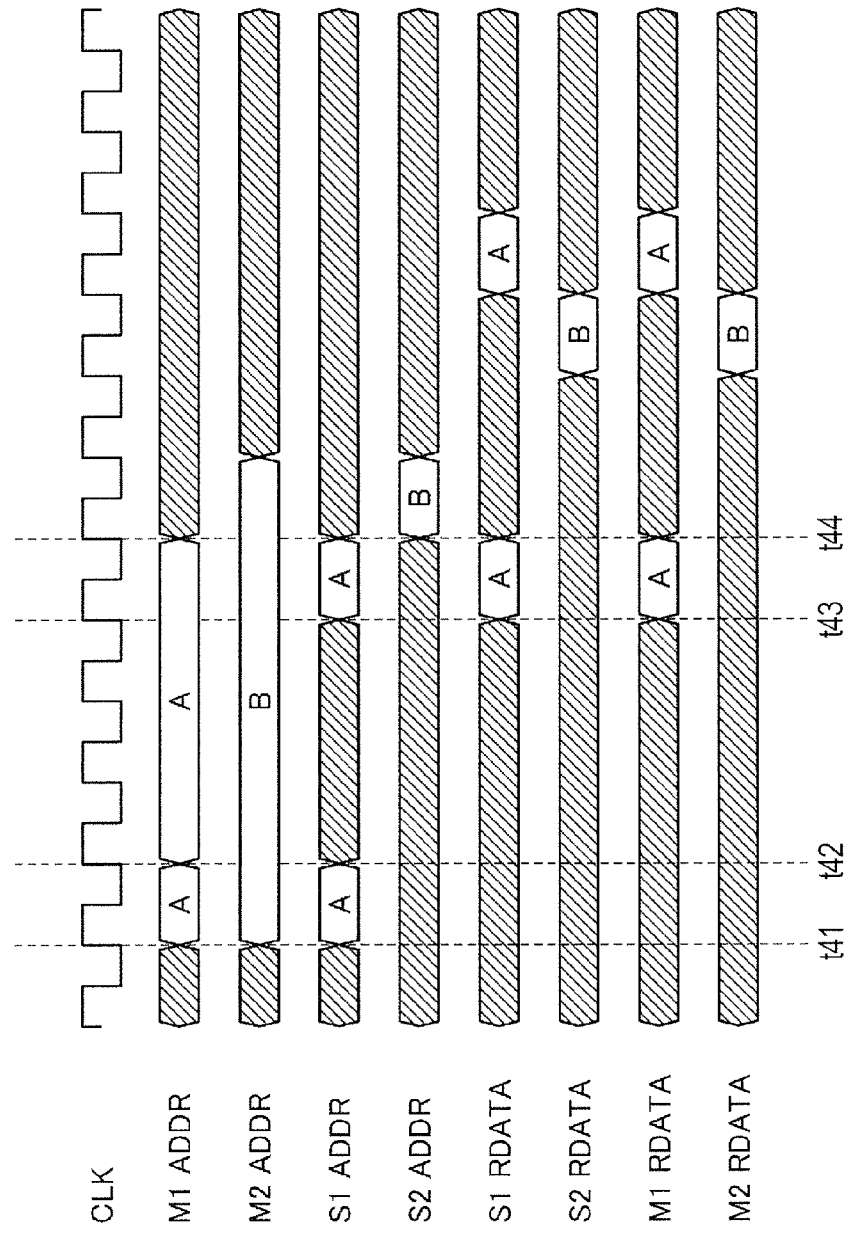

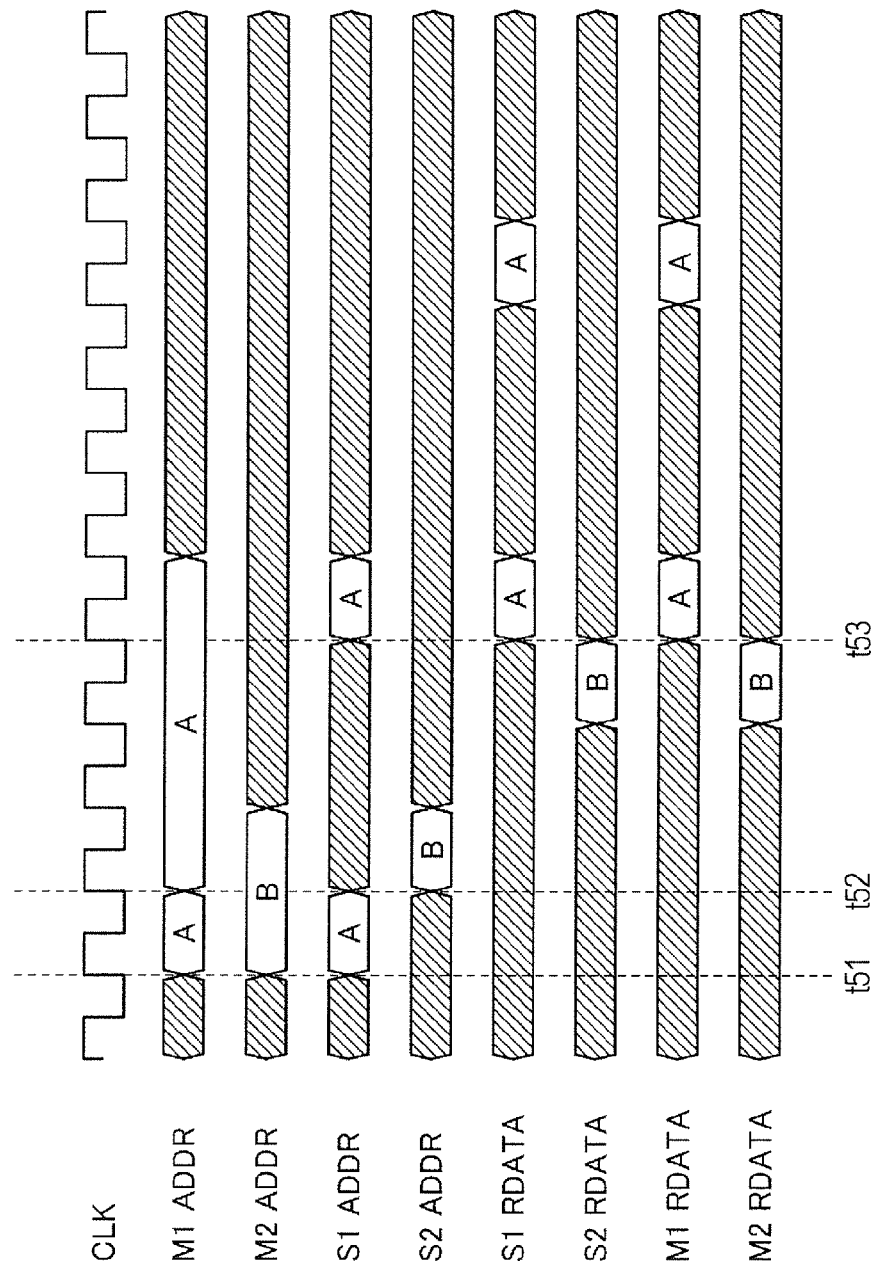

SEMICONDUCTOR DEVICE

CROSS-REFERENCE TO RELATED APPLICATIONS

The disclosure of Japanese Patent Application No. 2015-054518 filed on Mar. 18, 2015 including the specification, drawings and abstract is incorporated herein by reference in its entirety.

BACKGROUND

The disclosure relates to a semiconductor device that transfers data between a plurality of bus masters and a plurality of bus slaves through a bus, and particularly to a technique to arbitrate access through the bus.

A technique in which a plurality of bus masters and a plurality of bus slaves are coupled to each other through a bus and access from each bus master to each bus slave is controlled has been studied from the past. For example, in a semiconductor device such as a microcomputer, processors that are the bus masters and built-in memories that are the bus slaves are coupled to the bus, and an arbiter such as an address arbiter is provided. In the case where the bus masters compete with each other when accessing the bus in a transaction between the bus masters and the bus slaves, the arbiter arbitrates the bus masters accessing the bus slaves through the bus in accordance with the priority of each bus master. Further, the semiconductor device independently includes an address bus and a data bus, and can transfer data. In addition, the processing efficiency is improved by executing a command in an out-of-order process.

Various techniques to arbitrate data transfer between the bus masters and the bus slaves through the bus using the arbiter have been studied. For example, Japanese Unexamined Patent Application Publication No. 2006-331426 describes a technique in which a master logical unit and a slave logical unit are combined with each other to execute a transaction. According to the technique described in Japanese Unexamined Patent Application Publication No. 2006-331426, a mutual connection block includes arbiters such as an address arbiter and a read data arbiter, and arbitrates data transfer between a plurality of bus masters and a plurality of bus slaves in accordance with an arbitration policy. For example, according to the technique described in Japanese Unexamined Patent Application Publication No. 2006-331426, the address arbiter accepts a request of accessing a bus slave from a bus master having high priority.

SUMMARY

In the technique of Japanese Unexamined Patent Application Publication No. 2006-331426, the arbiter arbitrates data transfer through the bus between each bus master and each bus slave in accordance with the priority of each bus master. Specifically, the arbiter transfers data between each bus master and each bus master according to the order of the priority of each bus master. In this case, however, when there is a request of accessing from a bus master having high priority to one of the bus slaves that is in a busy state, the bus masters are arbitrated in accordance with the priority even if there is another request of accessing from another bus master to another bus slave. Thus, a request of accessing a bus slave that is not in a busy state cannot be accepted.

Therefore, a technique for further improving the processing efficiency has been required in the semiconductor device that arbitrates data transfer through the bus between the bus masters and the bus slaves.

The other objects and novel features will become apparent from the description of the specification and the accompanying drawings.

In a semiconductor device according to an embodiment, a plurality of bus masters and a plurality of bus slaves are coupled to each other through a bus, and a bus control device controls address transfer and data transfer between the bus masters and the bus slaves. The bus control device obtains access information representing the bus slave that each of the bus masters accesses on the basis of address signals output from the bus masters. The bus control device obtains busy information representing whether or not each bus slave is in a busy state. The bus control device arbitrates access from each bus master to the bus slave that is not in a busy state in accordance with the priority set for each bus master on the basis of the obtained access information and the obtained busy information.

According to the semiconductor device of the embodiment, the bus control device can control in such a manner that a bus master having high priority accesses a bus slave that is not in a busy state on the basis of the access information from each bus master to each bus slave, the busy condition of each bus slave, and the priority of each bus master. Accordingly, the processing efficiency can be further improved.

BRIEF DESCRIPTION OF THE DRAWINGS

FIG. 3 is a diagram for showing an operation example in the case where the bus control circuit 50 arbitrates data transfer between each bus master and each bus slave through a bus;

FIG. 4 is a diagram for showing an operation example of the bus control circuit in a related art in which a bus is arbitrated on the basis of only the priority of each bus master irrespective of whether or not a bus slave is in a busy state; and FIG. 5 shows an operation example of the bus control circuit 50 that controls in such a manner that a bus master having high priority accesses a bus slave that is not in a busy state on the basis of access information from each bus master to each bus slave, the busy condition of each bus slave, and the priority of each bus master in the embodiment.

DETAILED DESCRIPTION

Figure 1:
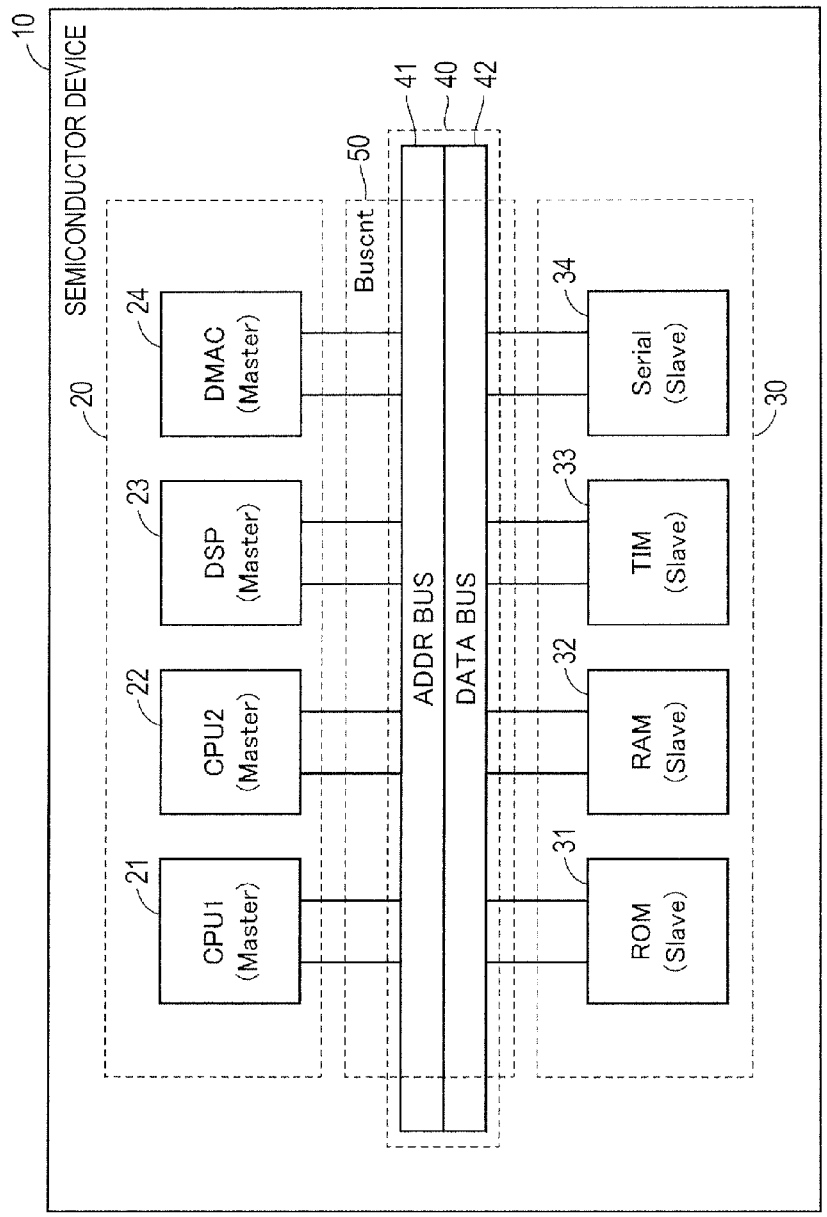
FIG. 1 is a block diagram for showing a configuration of a semiconductor device 10 according to an embodiment.

Hereinafter, embodiments of the present invention will be described with reference to the drawings. In the following description, the same constitutional elements are given the same reference numerals. The names and functions thereof are also the same. Thus, the detailed explanations thereof will not be repeated.

First Embodiment

A semiconductor device of an embodiment will be described with reference to the drawings.

<Configuration of Semiconductor Device>

FIG. 1 is a block diagram for showing a configuration of a semiconductor device 10 of the embodiment. As shown in FIG. 1, the semiconductor device 10 includes a bus master 20 having a plurality of bus masters (for example, a first CPU (Central Processing Unit) 21, a second CPU 22, a DSP (Digital Signal Processor) 23, a DMAC (Direct Memory Access controller) 24, and other devices), a bus slave 30 having a plurality of bus slaves (for example, a ROM (Read Only Memory) 31, a RAM (Random Access Memory) 32, a TIM (timing signal output circuit) 33, a Serial (serial communication module) 34, and other devices), a bus 40, and a bus control circuit 50. The first CPU 21 and the second CPU 22 control an operation of the semiconductor device 10.

The bus master 20 and the bus slave 30 are coupled to the bus 40 that functions as a data transfer route for address transfer and data transfer between the bus masters and the bus slaves. The bus 40 includes an address bus 41 and a data bus 42. The address bus 41 is a bus to transfer an address signal used when each bus master accesses each bus slave. The data bus 42 is a bus to transfer data between each bus master and each bus slave.

The bus control circuit 50 controls address transfer and data transfer between the bus masters and the bus slaves through the bus 40. As will be described later in detail, the bus control circuit 50 obtains access information representing the bus slaves that the respective bus masters access on the basis of the address signals output by the bus masters. Further, the bus control circuit 50 obtains busy information representing whether or not each bus slave is in a busy state. The bus control circuit 50 arbitrates access from each bus master to the bus slave that is not in a busy state in accordance with the priority set for each bus master on the basis of the access information and the busy information. Specifically, in the case where the bus slave to be accessed by the bus master having the highest priority is in a busy state, the bus control circuit 50 sequentially determines whether or not the other bus slaves are in a busy state. In the case where there is a bus slave that is not in a busy state, the bus control circuit 50 arbitrates to transfer data between the bus master and the bus slave.

Figure 2:
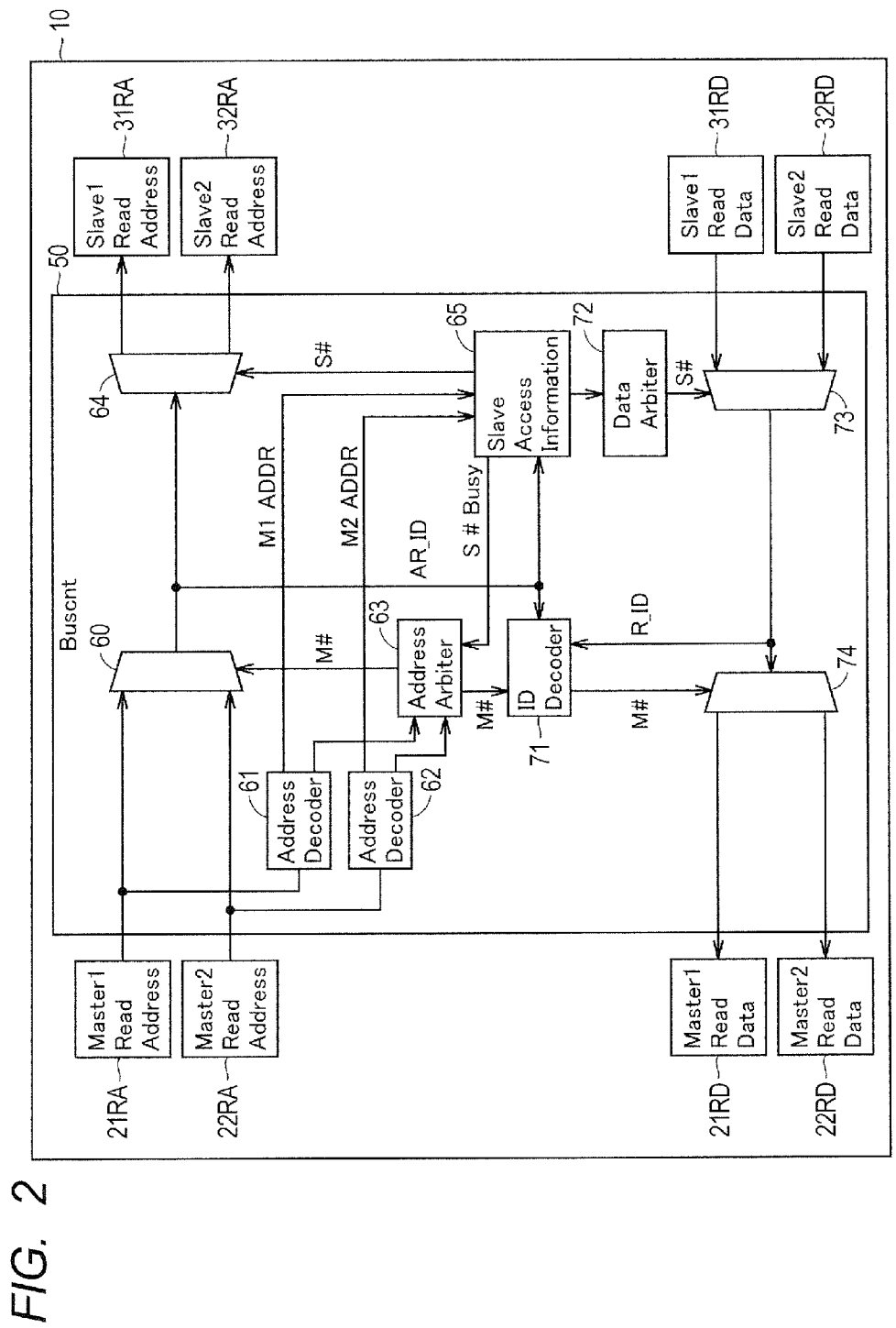
FIG. 2 is a diagram for showing a detailed configuration of a bus control circuit 50.

FIG. 2 is a diagram for showing a detailed configuration of the bus control circuit 50. As shown in FIG. 2, the bus control circuit 50 includes a multiplexer 60, a first address decoder 61, a second address decoder 62, an address arbiter 63, a demultiplexer 64, a slave access information management unit 65, an ID decoder 71, a data arbiter 72, a multiplexer 73, and a demultiplexer 74. FIG. 2 shows an example in which when a first bus master and a second bus master as an example of a plurality of bus masters competes with each other when accessing a bus slave through the bus 40, one of the first bus master and the second bus master is given priority to arbitrate access to the bus slave. However, the number of bus masters is not limited to two, but may be three or more. In this case, the address decoders (FIG. 2 shows two address decoders (the first address decoder 61 and the second address decoder 62) in accordance with two bus masters) may be provided in accordance with the number of bus masters.

First, a configuration to arbitrate competing access mainly in the address bus 41 will be described. The address signal from each bus master includes designation of a bus slave and an address for data processing. The address signal from each bus master is input to the multiplexer 60. The multiplexer 60 outputs any one of the address signals output from the respective bus masters to the demultiplexer 64 in accordance with the arbitration of the address arbiter 63.

The first address decoder 61 decodes an address included in a first master read address 21RA representing the read address of the first bus master, and outputs a decoded result (signal M1 ADDR) to the address arbiter 63 and the slave access information management unit 65. The second address decoder 62 decodes an address included in a second master read address 22RA representing the read address of the second bus master, and outputs a decoded result (signal M2 ADDR) to the address arbiter 63 and the slave access information management unit 65.

In the case where the bus masters compete with each other when accessing a bus slave, the address arbiter 63 arbitrates the access on the basis of the priority that is preliminarily set for each bus master. The address arbiter 63 accepts from the slave access information management unit 65 a signal (signal S# Busy) representing the bus slave in a busy state. The address arbiter 63 preliminarily holds priority settings about which bus master is given priority. In the case where the bus masters compete with each other when accessing a bus slave, if the bus slave to be accessed by the bus master having high priority is not in a busy state, the address arbiter 63 arbitrates an output of the multiplexer 60 so as to transfer data between the bus master having high priority and the bus slave (signal M#). In the case where the bus slave to be accessed by the bus master having high priority is in a busy state, the address arbiter 63 determines whether or not the bus slave to be accessed by the bus master having the second-highest priority is in a busy state. If the bus slave is not in a busy state, the address arbiter 63 arbitrates so as to transfer data between the bus master and the bus slave.

The slave access information management unit 65 manages access conditions from the respective bus masters to the bus slaves through the bus 40. The slave access information management unit 65 accepts from the first address decoder 61 and the second address decoder 62 the recoded result of the address signal each bus master accesses, and holds access conditions from the respective bus masters to the bus slaves. The slave access information management unit 65 manages an association of access between the bus masters and the bus slaves by accepting the decoded result of the address signal from each bus master. Further, the slave access information management unit 65 holds information of the upper limit of access that can be accepted by each bus slave. In the case where there is a bus slave that has reached the upper limit of access, the slave access information management unit 65 notifies the address arbiter 63 of the fact that the bus slave is in a busy state because of having reached the upper limit of access. Accordingly, the address arbiter 63 can perform a process such as giving priority to the bus master that accesses the bus slave that is not in a busy state.

As described above, the address signal output from each bus master is transmitted from the multiplexer 60 to the demultiplexer 64. The slave access information management unit 65 controls an output of the demultiplexer 64 by designating the bus slave to which the demultiplexer 64 outputs the address signal accepted from the multiplexer 60.

The address signal output from the multiplexer 60 includes an ID value (signal AR_ID). For example, in the case where a single ID value is assigned to each bus master, each bus master includes the assigned ID value in the address signal. Specifically, the ID value includes information identifying a transaction. Further, in the case where a bus master uses a plurality of ID values, the transaction of the special bus master can be classified in more detail. The ID value included in the address signal output from the multiplexer 60 is input to the slave access information management unit 65 and the ID decoder 71.

The slave access information management unit 65 associates each ID value accepted from the multiplexer 60 with information of the designated bus slave to which the demultiplexer 64 outputs the address signal, and holds the same until the transaction is completed. Specifically, the slave access information management unit 65 secures, for example, a FIFO (First In First Out) buffer for each ID value included in the address signal output from the multiplexer 60, and stores into the FIFO buffer of each ID value the information of the designated bus slave (signal S#) to which the demultiplexer 64 outputs the address signal. The information stored in the FIFO buffer is retrieved by the data arbiter 72.

It should be noted that criteria to determine that a bus slave is in a busy state when the slave access information management unit 65 notifies the address arbiter 63 of the busy state can be variously changed. For example, the upper limit of access that can be accepted by each bus slave may be fixed or set. Further, the slave access information management unit 65 may set the number of accesses that can be accepted by each bus slave in accordance with the operating frequency settings of the semiconductor device 10.

Next, a configuration to arbitrate competing access for data transfer in the data bus 42 will be described. In the data bus 42, the multiplexer 73 accepts data transferred from respective bus slaves (FIG. 2 shows an example of two bus slaves of first slave read data 31RD and second slave read data 32RD).

The data arbiter 72 outputs the signal (signal S#) designating a bus slave to the multiplexer 73 to control from which bus slave the multiplexer 73 transfers data to the demultiplexer 74. The data arbiter 72 refers to information held by the slave access information management unit 65 to control from which bus slave the multiplexer 73 transfers data to the demultiplexer 74.

The slave access information management unit 65 holds the information (signal S#) of the bus slave to which the demultiplexer 64 outputs the address signal while being associated with an ID value. The data arbiter 72 holds an arbitration policy representing from which ID value the data transfer is given priority in the information held by the slave access information management unit 65, and controls an output of the multiplexer 73 in accordance with the arbitration policy. For example, in the case where an ID value is associated with each bus master, the data arbiter 72 controls an output of the multiplexer 73 by designating the bus slave (signal S#) associated with the ID value in accordance with the priority of the bus master.

The multiplexer 73 outputs any one of data input from the respective bus slaves to the demultiplexer 74 in accordance with the arbitration of the data arbiter 72. The data output from the multiplexer 73 includes information (information identifying a transaction) (signal R_ID) identifying a destination bus master that represents which transaction the response is for.

The ID decoder 71 accepts the signal (signal R_ID) that is included in the data output from the multiplexer 73 and that includes information representing the bus master having issued the transaction. Further, the ID decoder 71 associates the information (signal M#) representing the output of the bus master that was given priority as an arbitration result of the output of the multiplexer 60 from the address arbiter 63 with the ID value (signal AR_ID) included in the data transferred from the multiplexer 60 to the demultiplexer 64, and holds the same in a table. The ID decoder 71 searches the table held by the ID decoder 71 to specify the bus master having issued the transaction on the basis of the information (signal R_ID) that is included in the data output from the multiplexer 73 and that identifies the transaction. Then, the ID decoder 71 outputs the signal (signal M#) representing the specified bus master to the demultiplexer 74.

The demultiplexer 74 outputs the data transferred from the multiplexer 73 to any one of respective bus masters (FIG. 2 shows a first master read address 21RD and a second master read address 22RD) in accordance with the arbitration of the ID decoder 71.

On the basis of such a configuration, the bus control circuit 50 can control the bus master having high priority to access the bus slave that is not in a busy state based on the access information from each bus master to each bus slave, the busy condition of each bus slave, and the priority of each bus master, and the efficiency of the process can be further improved.

<Operation Example>

With reference to FIG. 3 to FIG. 5, an operation example of arbitrating access from each bus master to each bus slave will be described. In each of FIG. 3 to FIG. 5, a signal CLK represents the waveform of a clock signal. Further, each of FIG. 3 to FIG. 5 shows an example in which two bus masters of a bus master "M1" and a bus master "M2" as a plurality of bus masters access each bus slave. The priority of the bus master "M1" is set higher than that of the bus master "M2". Further, each of FIG. 3 to FIG. 5 shows an example in which a bus slave "S1" and a bus slave "S2" as a plurality of bus slaves accept access from each bus master. Further, a symbol "A" in each of FIG. 3 to FIG. 5 represents access from the bus master "M1" to the bus slave "S1". A symbol "B" represents access from the bus master "M2" to the bus slave "S2". Further, a symbol "ADDR" represents data transfer through the address bus 41, and a symbol "RDATA" represents transfer of read data through the data bus 42. Further, the number of waits in data transfer from each bus master to the bus slave "S1" is set at 3, and the number of waits in data transfer from each bus master to the bus slave "S2" is set at 1.

FIG. 3 is a diagram for showing an operation example in the case where the bus control circuit 50 arbitrates data transfer between the bus masters and the bus slaves through the bus.

As shown in FIG. 3, the bus masters (the bus master "M1" and the bus master "M2") compete with each other when accessing the bus slave through the address bus 41 at timing t31. The address arbiter 63 and the slave access information management unit 65 arbitrate access from each bus master to each bus slave so as to give priority to transfer of an address signal from the bus master "M1" to the bus slave "S1" in accordance with the priority of each bus master. The bus master "M1" transfers the address signal to the bus slave "S1" through the address bus 41, and then receives data from the bus slave "S1" through the address bus 41 after waiting for a period of time of three waits.

When the transfer of the address signal from the bus master "M1" to the bus slave "S1" is completed at timing t32, the bus master "M2" that is the highest in priority next to the bus master "M1" transfers the address signal to the bus slave "S2" through the address bus 41. The bus master "M2" transfers the address signal to the bus slave "S2" through the address bus 41, and then receives data from the bus slave "S2" through the address bus 41 after waiting for a period of time of one wait.

The bus master "M1" and the bus master "M2" do not compete with each other when accessing at timing t33. Therefore, the data is transferred from the bus slave "S2" to the bus master "M2" through the data bus 42.

The data is transferred from the bus slave "S1" to the bus master "M1" through the data bus 42 at timing t34.

The following is a description of a related art for comparison in which the bus control circuit arbitrates the bus on the basis of only the priority of each bus master irrespective of the configuration as described in the embodiment.

As the related art, FIG. 4 is a diagram for showing an operation example of the bus control circuit in the case where the bus is arbitrated on the basis of only the priority of each bus master irrespective of whether or not each bus slave is in a busy state.

The bus masters (the bus master "M1" and the bus master "M2") compete with each other when accessing to the bus slave through the address bus 41 at timing t41. In this case, the bus control circuit in the related art arbitrates so as to give priority to the transfer of the address signal from the bus master "M1" to the bus slave "S1" in accordance with the priority of each bus master.

The bus master "M1" issues a transaction for newly accessing the bus slave "S1" at timing t42. However, the bus slave "S1" is in a busy state because the bus slave "S1" has accepted the access from the bus master "M1" at the timing t41. Thus, the bus master "M1" cannot access the bus slave "S2" at the timing t42.

The busy state of the bus slave "S1" is cancelled at timing t43. The bus control circuit gives priority to the bus master "M1" in accordance with the priority of each bus master, and transfers the address signal from the bus master "M1" to the bus slave "S1".

The bus control circuit transfers the address signal from the bus master "M2" to the bus slave "S2" at timing t44.

As described above, the bus is arbitrated on the basis of only the priority of each bus master irrespective of whether or not each bus slave is in a busy state in the related art. Accordingly, if there is access from the bus master (the bus master "M1") having high priority, access from another bus master (the bus master "M2") to another bus slave cannot be accepted as in a period from, for example, the timing t42 to the timing t43, and the processing performance is deteriorated.

FIG. 5 shows an operation example of the bus control circuit 50 that controls the bus master having high priority to access the bus slave that is not in a busy state based on the access information from each bus master to each bus slave, the busy condition of each bus slave, and the priority of each bus master in the embodiment.

The bus masters (the bus master "M1" and the bus master "M2") compete with each other when accessing the bus slave through the address bus 41 at timing t51. The address arbiter 63 and the slave access information management unit 65 arbitrate access from each bus master to each bus slave so as to give priority to transfer of an address signal from the bus master "M1" to the bus slave "S1" in accordance with the priority of each bus master.

The bus master "M1" issues a transaction for newly accessing the bus slave "S1" at timing t52. However, the bus slave "S1" is in a busy state, and thus the slave access information management unit 65 outputs to the address arbiter 63 a signal (signal S1 Busy) representing that the bus slave "S1" is in a busy state. The address arbiter 63 accepts the signal (signal S1 Busy) output from the slave access information management unit 65, and controls an output of the multiplexer 60 so as to designate the bus master that accesses the bus slave that is not in a busy state. Specifically, the address arbiter 63 controls the multiplexer 60 to output to the demultiplexer 64 the address signal from the bus master "M2" that is the bus master accessing the bus slave "S2" that is not in a busy state. Accordingly, the transaction of accessing from the bus master "M2" to the bus slave "S2" is executed between the timing t52 and the timing t53.

The busy state of the bus slave "S1" is cancelled at timing t53, and thus the address arbiter 63 and the slave access information management unit 65 arbitrate to transfer the address signal from the bus master "M1" to the bus slave "S1".

<Summary of First Embodiment>

According to the semiconductor device 10 of the first embodiment, in a system in which an address arbiter, a read data arbiter, and a write data arbiter are independently provided and a process can be executed in an out-of-order condition in a transaction between masters and slaves, the address arbiter arbitrates a bus on the basis of decoded information obtained by decoding an address and busy information representing whether or not each slave is in a busy state. Accordingly, even when a slave is in a busy state, a master can access another slave that is not in a busy state through the bus, and thus the performance of the entire bus can be further improved.

Second Embodiment

In the first embodiment, the address arbiter 63 obtains information representing whether or not each bus slave is in a busy state on the basis of the signal output from the slave access information management unit 65. The present invention is not to the configuration in which the address arbiter 63 obtains the busy information representing whether or not each bus slave is in a busy state.

For example, in the case where a bus slave is in a busy state, the bus slave outputs a signal representing a busy state in the second embodiment. The address arbiter 63 accepts the signal representing a busy state from each bus slave. Thus, according to the second embodiment, even in the case where the slave access information management unit 65 does not manage the upper limit of access to each bus slave, it is possible to arbitrate the bus master to access the bus slave that is not in a busy state by accepting the signal representing a busy state from each bus slave. Accordingly, the efficiency of the process can be further improved.

The invention achieved by the inventors has been concretely described above on the basis of the embodiments. However, it is obvious that the present invention is not limited to the embodiments, but can be variously changed without departing from the scope of the present invention.

It should be understood that the embodiments disclosed herein are illustrative examples in all respects, and do not limit the present invention. The scope of the invention is represented by not the above description but the claims, and the disclosure intends to include all changes in the meaning and scope equivalent to the claims.

What is claimed is:

1. A semiconductor device comprising:
   a plurality of bus masters:
   a plurality of bus slaves:
   a bus that is coupled to the bus masters and the bus slaves to perform address transfer and data transfer between the bus masters and the bus slaves; and
   a bus control device that controls the address transfer and the data transfer through the bus,
   wherein the bus control device obtains access information representing the bus slave that each of the bus masters accesses on, the basis of address signals output from the bus masters, obtains busy information representing whether or not the bus slave is in a busy state, and includes an arbitration unit that arbitrates access from each bus master to, the bus slave that is not in a busy state in accordance with a priority set for each bus master on the basis of the obtained access information and the obtained bust information,
   wherein the bus control device further includes an access management unit that accepts the address signals that the bus masters output to access the bus slaves, that holds information representing access conditions from the bus masters to the bus slaves on the basis of the accepted address signals to manage whether or not each bus slave is in a busy state, and that notifies the arbitration unit of information representing the bus slave in a busy state, wherein the obtaining of the busy information by the arbitration unit includes the accepting of the information representing the bus slave in a busy state from the access management unit, wherein the arbitration unit is configured to arbitrate data transfer from each bus slave to each bus master, and arbitrates from which bus slave the data is transferred to each bus master on the basis of the information representing the access conditions, and wherein the access management unit is configured to update the information representing the access conditions from the bus masters to the bus slaves on the basis of a result arbitrated by the arbitration unit.

2. A semiconductor device comprising:

a plurality of bus masters:

a plurality of bus slaves:

a bus that is coupled to the bus masters and the bus slaves to perform address transfer and data transfer between the bus masters and the bus slaves; and a bus control device that controls the address transfer and the data transfer through the bus, wherein the bus control device obtains access information representing the bus slave that each of the bus masters accesses on the basis of address signals output from the bus masters, obtains busy information representing whether or not the bus slave is in a busy state, and includes an arbitration unit that arbitrates access from each bus master to the bus slave that is not in a busy state in accordance with a priority set for each bus master the basis of the obtained access information and the obtained busy information, wherein the bus control device further includes an access management unit that accepts the address signals that the bus masters output to access the bus slaves, that holds, information representing access conditions from the bus masters to the bus slaves on, the basis of the accepted address signals to manage whether or not each bus slave is in a busy state, and that notifies the arbitration unit of information representing the bus slave in a busy state, wherein the obtaining of the busy information by the arbitration, unit includes the accepting of the information representing the bus slave in a busy state from the access management unit, and wherein the access management unit manages an upper limit of access that can be accepted by each bus slave, and the notifying of the information representing the bus slave in a busy state to the arbitration unit includes notifying of information representing that the bus slave having reached the upper limit of access is in a busy state to the arbitration unit in the case where the bus slave has reached the upper limit of access.

* * * * *